(12) United States Patent
Kollata et al.

(10) Patent No.: US 12,157,304 B2
(45) Date of Patent: Dec. 3, 2024

(54) PRINTER CALIBRATION MODULE (71) Applicant: Kateeva, Inc., Newark, CA (US)

(72) Inventors: Eashwer Chandra Vidhya Sagar Kollata, Fremont, CA (US); Christopher Buchner, Sunnyvale, CA (US); Alexander Sou-Kang Ko, Santa Clara, CA (US); Senn Van Ly, Antioch, CA (US); Matthew Burton Sheffield, San Ramon, CA (US)

(73) Assignee: Kateeva, Inc., Newark, CA (US)

( * ) Notice: Subject to any disclaimer, the term of this patent is extended or adjusted under 35 U.S.C. 154(b) by 0 days.

(21) Appl. No.: 18/480,418

(22) Filed: Oct. 3, 2023

(65) Prior Publication Data
US 2024/0025171 A1 Jan. 25, 2024

Related U.S. Application Data (63) Continuation of application No. 17/448,720, filed on Sep. 24, 2021, now Pat. No. 11,813,858, which is a continuation of application No. 16/880,129, filed on May 21, 2020, now Pat. No. 11,155,077.

(60) Provisional application No. 62/948,534, filed on Dec. 16, 2019, provisional application No. 62/855,675, filed on May 31, 2019.

(51) Int. Cl.
B41J 2/045 (2006.01)
(52) U.S. Cl.
CPC ....... B41J 2/04505 (2013.01); B41J 2/04586 (2013.01)

(58) Field of Classification Search
CPC .. B41J 2/0456; B41J 2/04581; B41J 2/04505; B41J 2/04586; B41J 11/001; B41J 3/28; B41J 29/393
See application file for complete search history.

(56) References Cited

U.S. PATENT DOCUMENTS

| 5,323,179 | A | 6/1994 | Sanger |
| 7,823,535 | B2 | 11/2010 | Hanafusa |
| 9,110,129 | B1 | 8/2015 | Ames |
| 9,444,050 | B2 | 9/2016 | Madigan |
| 11,155,077 | B2 | 10/2021 | Kollata et al. |
| 11,813,858 | B2 | 11/2023 | Kollata et al. |
| 2005/0007442 | A1 | 1/2005 | Kay |
| 2005/0264777 | A1 | 12/2005 | Gardner |

(Continued)

FOREIGN PATENT DOCUMENTS

| CN | 101258030 B | 5/2011 |
| CN | 104136917 B | 5/2017 |

(Continued)

OTHER PUBLICATIONS

First Office Action dated Jul. 27, 2022 for CN Patent Application No. 202080040214.5.

(Continued)

Primary Examiner — Thinh H Nguyen
(74) Attorney, Agent, or Firm — Hauptman Ham, LLP (57) ABSTRACT An inkjet printer is disclosed that has a substrate support; a calibration module disposed adjacent to the substrate support and comprising a stage member; and a print assembly disposed across the substrate support, the print assembly comprising a printhead and a calibration imaging device positionable to face the stage member.

18 Claims, 9 Drawing Sheets

(56) References Cited

U.S. PATENT DOCUMENTS

| | | |
|---|---|---|
| 2011/0149000 A1 | 6/2011 | Albertalli |
| 2016/0255727 A1 | 9/2016 | Zwiers |
| 2017/0028731 A1 | 2/2017 | Ko |
| 2017/0144462 A1 | 5/2017 | Lowrance |
| 2018/0264862 A1 | 9/2018 | Lawrence |
| 2018/0283856 A1 | 10/2018 | Suemasu |
| 2019/0275817 A1 | 9/2019 | Billow |
| 2021/0050270 A1* | 2/2021 | Kim ............... H10K 71/00 |
| 2021/0146682 A1 | 5/2021 | Molins Cabani |

FOREIGN PATENT DOCUMENTS

| | | |
|---|---|---|
| CN | 106687297 B | 8/2019 |
| JP | 2009131789 A | 6/2009 |
| JP | 2010046944 A | 3/2010 |
| JP | 2010227788 A | 10/2010 |
| JP | 2010280472 A | 12/2010 |
| JP | 2012176852 A | 9/2012 |
| JP | 2017525600 A | 9/2017 |
| JP | 2017529223 A | 10/2017 |
| JP | 2019000780 A | 1/2019 |
| JP | 2022526865 A | 5/2022 |
| KR | 20110047148 | 5/2011 |
| KR | 20160083420 | 7/2016 |
| WO | 2014176365 A2 | 10/2014 |
| WO | 2019017863 A1 | 1/2019 |

OTHER PUBLICATIONS

International Search and Written Opinion issued Aug. 17, 2020 to PCT Application PCT/US2020/033905.

Non-final Office Action issued Jun. 17, 2022 for JP Patent Application No. 2021-571054.

Non-final Office Action issued Jun. 24, 2021 for U.S. Appl. No. 16/880,129.

Non-final Office Action issued Mar. 2, 2023 for U.S. Appl. No. 17/448,720.

Notice of Allowance issued Aug. 4, 2021 for U.S. Appl. No. 16/880,129.

Notice of Allowance issued Jul. 6, 2023 for U.S. Appl. No. 17/448,720.

Notification of Reasons for Refusal Issued Feb. 18, 2022 in KR Patent Application No. 10-2021-7042626.

English Translation of Request for Cancellation issued Jan. 17, 2023 in KR Patent No. 10-2436861.

Notice of Office Action issued Dec. 13, 2023 in KR Patent Application No. 10-2022-7028978.

* cited by examiner

PRINTER CALIBRATION MODULE

CROSS-REFERENCE TO RELATED APPLICATIONS

This application is a continuation of U.S. patent application Ser. No. 17/448,720, filed on Sep. 24, 2021, which is a continuation of U.S. patent application Ser. No. 16/880,129, filed May 21, 2021, now U.S. patent Ser. No. 11/155,077, issued on Oct. 26, 2021, which claims benefit of U.S. Provisional Patent Application Nos. 62/855,675 filed on May 31, 2019, and 62/948,534 filed on Dec. 16, 2019, each of which is entirely incorporated by reference herein.

FIELD

Embodiments described herein generally relate to inkjet printers for industrial applications. Specifically, embodiments of testing modules for industrial scale inkjet printers are described herein.

BACKGROUND

Large inkjet printers are often used to print patterns on large substrates with extreme precision. An example is the production of display screens. The various functional materials that produce an operative display screen can be deposited on a glass substrate, or another kind of substrate, by inkjet printing microscopic droplets on the substrate and then solidifying the droplets into a functional material. The droplets can be as small as 10 µm in diameter, but must be deposited in a way that forms a layer, or partial layer, of uniform thickness. Thus, the spacing of the droplet deposition must be extremely precise, with positional error of no more than about 10 µm in some cases. The print material is ejected from a printing assembly that has one or more nozzles capable of creating the microscopic droplets, and the precision requirements of such applications mean that the nozzles must dispense droplets very precisely and predictably.

In conventional printers, the print heads are tested by printing a test pattern on a substrate. A substrate similar to the substrate used to make, for example, a display product is positioned in the printer, and a test pattern is printed on the substrate. The test pattern is evaluated by photographing the printed test pattern and then performing image processing to evaluate the accuracy of the printed pattern. This process takes time to install and extract the substrate, and requires use of a test substrate, which can be expensive. There is a need for a more efficient print head test module for industrial scale inkjet printers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
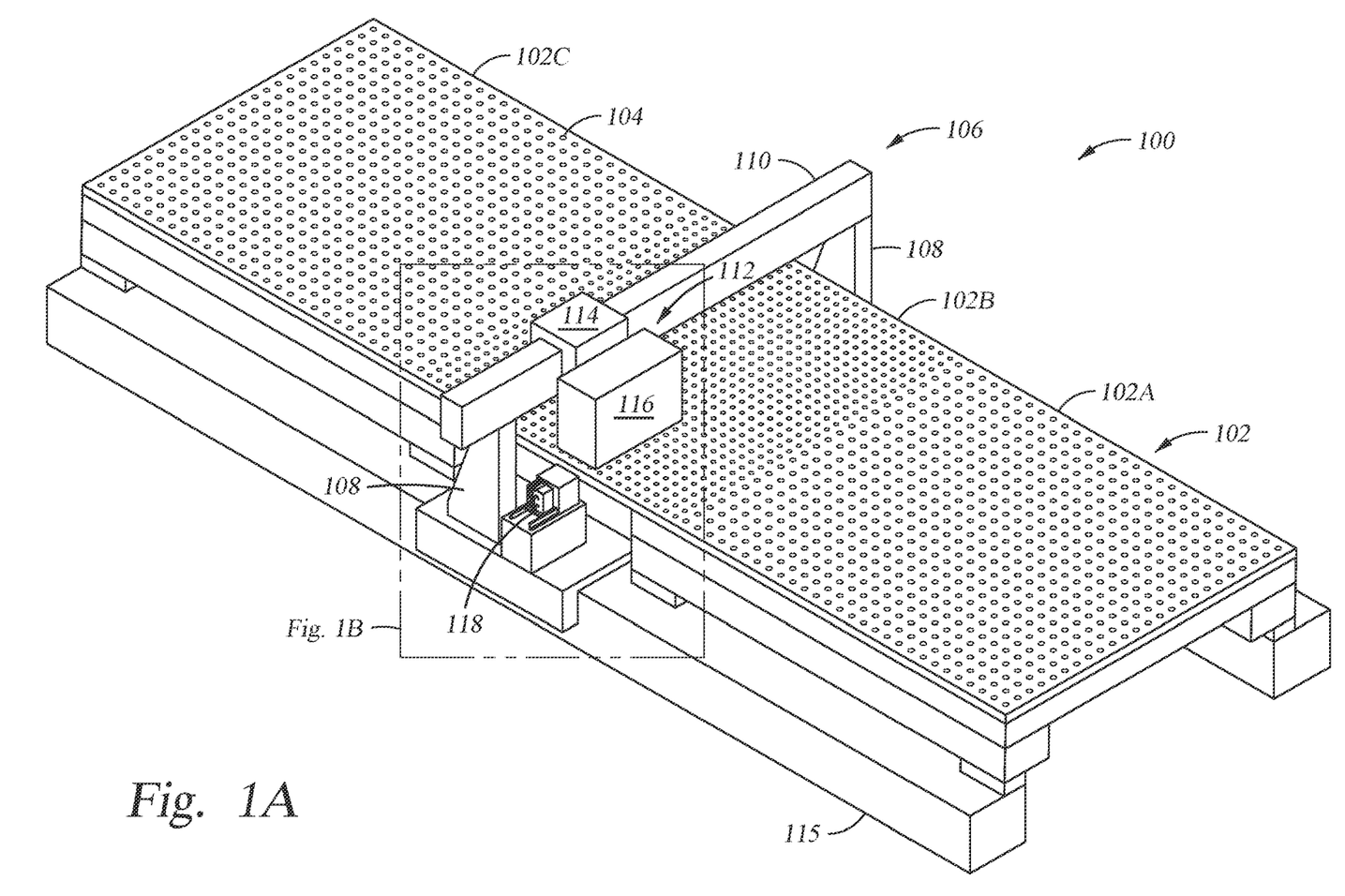
FIG. 1A is an isometric view of a printer according to one embodiment.

FIG. 1A is an isometric view of a printer 100 according to one embodiment. The printer 100 has a support surface 102 on which a substrate is disposed for printing. The support surface 102 has a plurality of holes 104 through which gas is provided to form a gas cushion to support the substrate. The support surface 102 has three sections. A first section 102A at a first end 103 of the support surface 102 is a staging area for a substrate to be printed. A second section 102B, in the middle of the support surface 102, is a print zone where a substrate is positioned during printing. A third section 102C, at a second end 104 of the support surface 102 opposite from the first end 103, is also a staging area or support area for manipulating a substrate during printing. The substrate is moved along the support surface 102 from the first section 102A, through the second section 102B, to the third section 102C to position various parts of the substrate for printing.

The holes 104 in the second section 102B can be different from the holes 104 in the first and third sections 102A and 102C. Some of the holes 104 in the second section 102B can be used to remove gas from the gas cushion to control substrate elevation above the support surface 102. Thus, the holes 104 in the second section 102B may have different pitch, size, or arrangement than the holes 104 in the first and third sections 102A and 102C.

A print assembly 106 is disposed across and above the middle of the support surface 102. The print assembly 106 comprises two stands 108 and a beam 110 coupled to the two stands 108. The beam 110 extends across the second section 102B of the support surface 102. A printhead assembly 112 is coupled to the beam 110. The printhead assembly 112 includes a carriage 114 that coupled to the beam 110 and a printhead housing 116 that couples to the carriage 114. The printhead housing 116 includes one or more printheads (not visible in FIG. 1A) that dispense print material onto a substrate positioned, at least in part, in the second section 102B. The carriage 114 moves along the beam 110 to position the printhead housing 116 along the support surface 102 in a first direction. The substrate is moved along the support surface 102 in a second direction transverse to the first direction. In this way a target location of the substrate can be positioned such that the printheads can be brought into proximity for printing at the target location.

The support surface 102, print assembly 106, and test module 118 are all supported on a massive base 115 that securely supports operation of the printer with minimal vibration that could introduce errors into the printing operation. The printhead assembly 112 can move to the end of the beam 110. At the near end of the beam 110, a test module 118 is positioned adjacent to the support surface 102 next to one of the stands 108. The printhead assembly 112 can move the printheads into proximity to the test module 118 to test print nozzle operation.

Figure 1B:
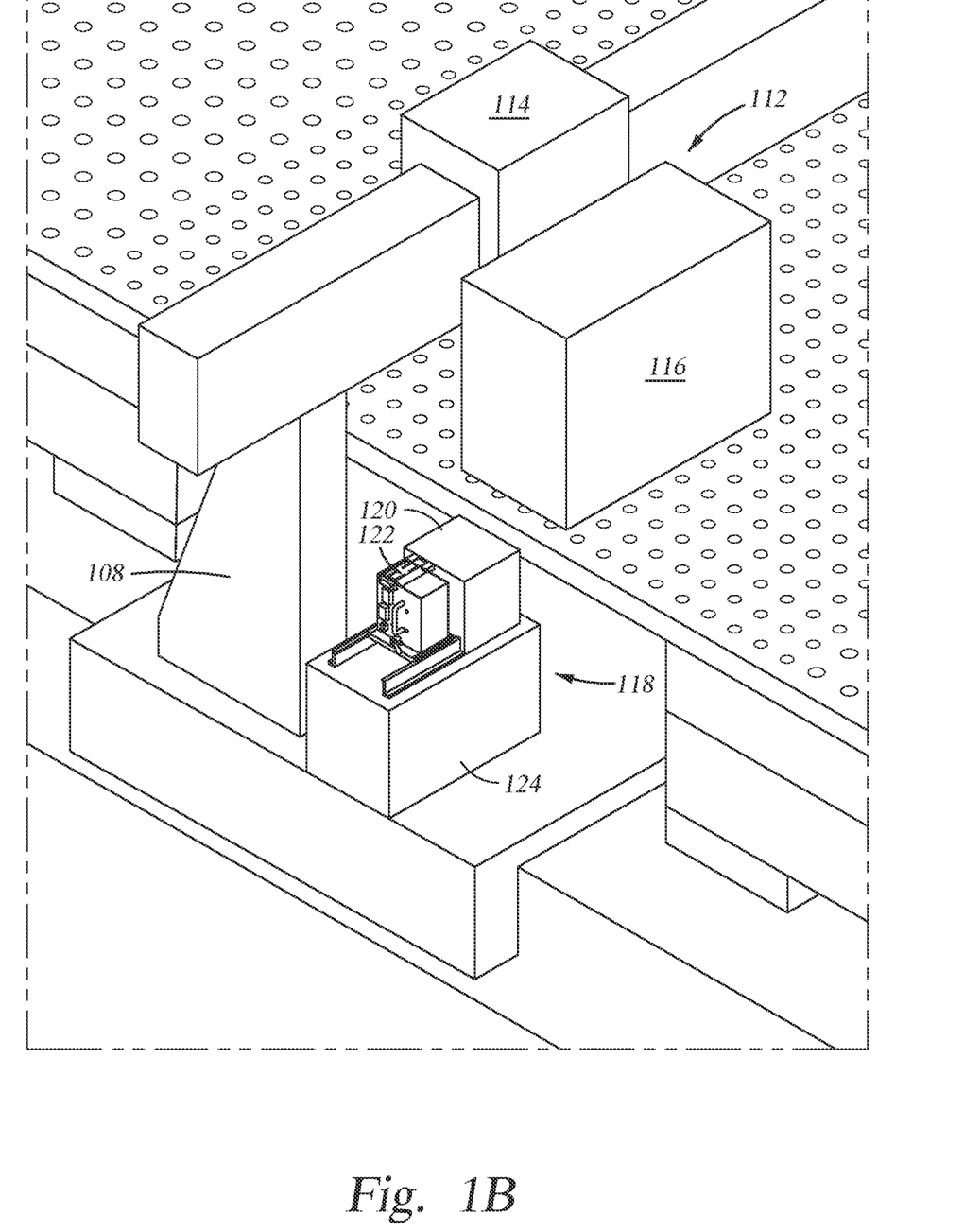
FIG. 1B is a close-up view of a test module according to one embodiment.

FIG. 1B is a close-up view of the test module 118. The test module 118 has a mount 120 and a test cassette 122 that couples to the mount 120. The test module 118 is positioned on a linear actuator 124 that can move the test module 118 along the second direction. The test cassette 122 includes a testing substrate that can be repeatedly used to print test patterns for evaluation. As further described below, the test module 118 is scanned along the second direction while the printheads of the printhead assembly dispense print material onto the testing substrate to simulate production print conditions.

Figure 2:
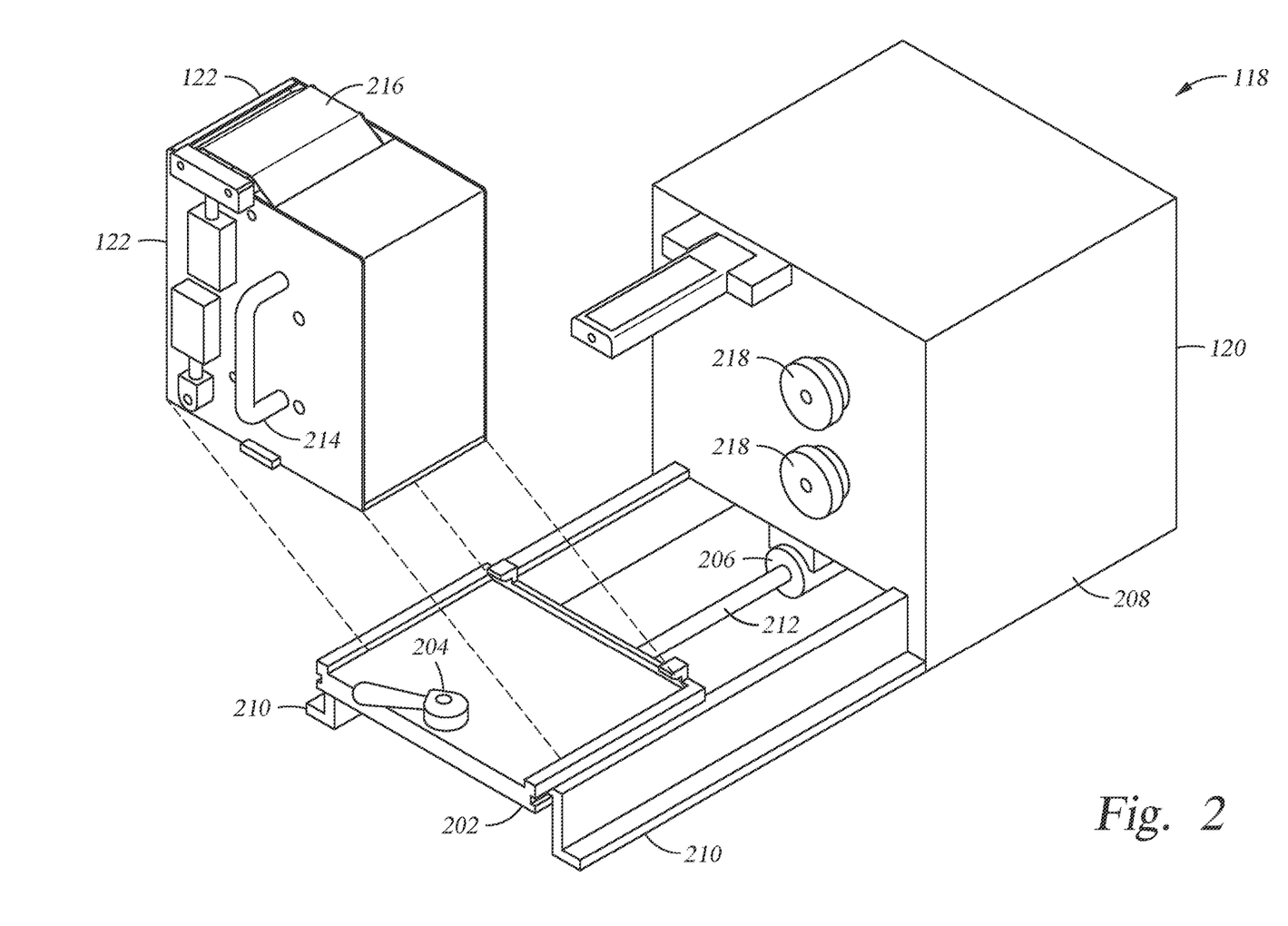
FIG. 2 is a disassembled view of the test module of FIG. 1B.

FIG. 2 is a disassembled view of the test module 118. The test cassette 122 is shown decoupled from the mount 120. The test cassette 122 is positioned on a tray 202 of the mount 120 for installation on the mount 120. The tray 202 includes a latch 204 that securely holds the test cassette 122 upon installation and setting of the latch 204. The tray 202 is moved into operating position by a tray actuator 206 located below a drive 208 that operates the test cassette 122 when installed on the mount 120. The tray 202 rides on one or more slides 210 that extend from the drive 208 and allow linear motion of the tray 202 from an operating position near the drive 208, so that the test cassette 122 can couple to the drive 208, to a loading position away from the drive 208. The tray actuator 206 includes a rod 212 that couples the tray 202 to the tray actuator 206 and moves the tray 202 along the slides 210.

The test cassette 122 includes a handle 214 to allow installation and removal of a test cassette 122 from the mount 120. The test cassette 122 includes a test substrate 216 that is maneuvered by co-operation of the test cassette 122 and the drive 208, to a position at a top location of the test cassette 122 for access by the printheads. The drive 208 has two rotators 218 that rotate mandrels within the test cassette 122 to manipulate the test substrate 216.

Figure 3:
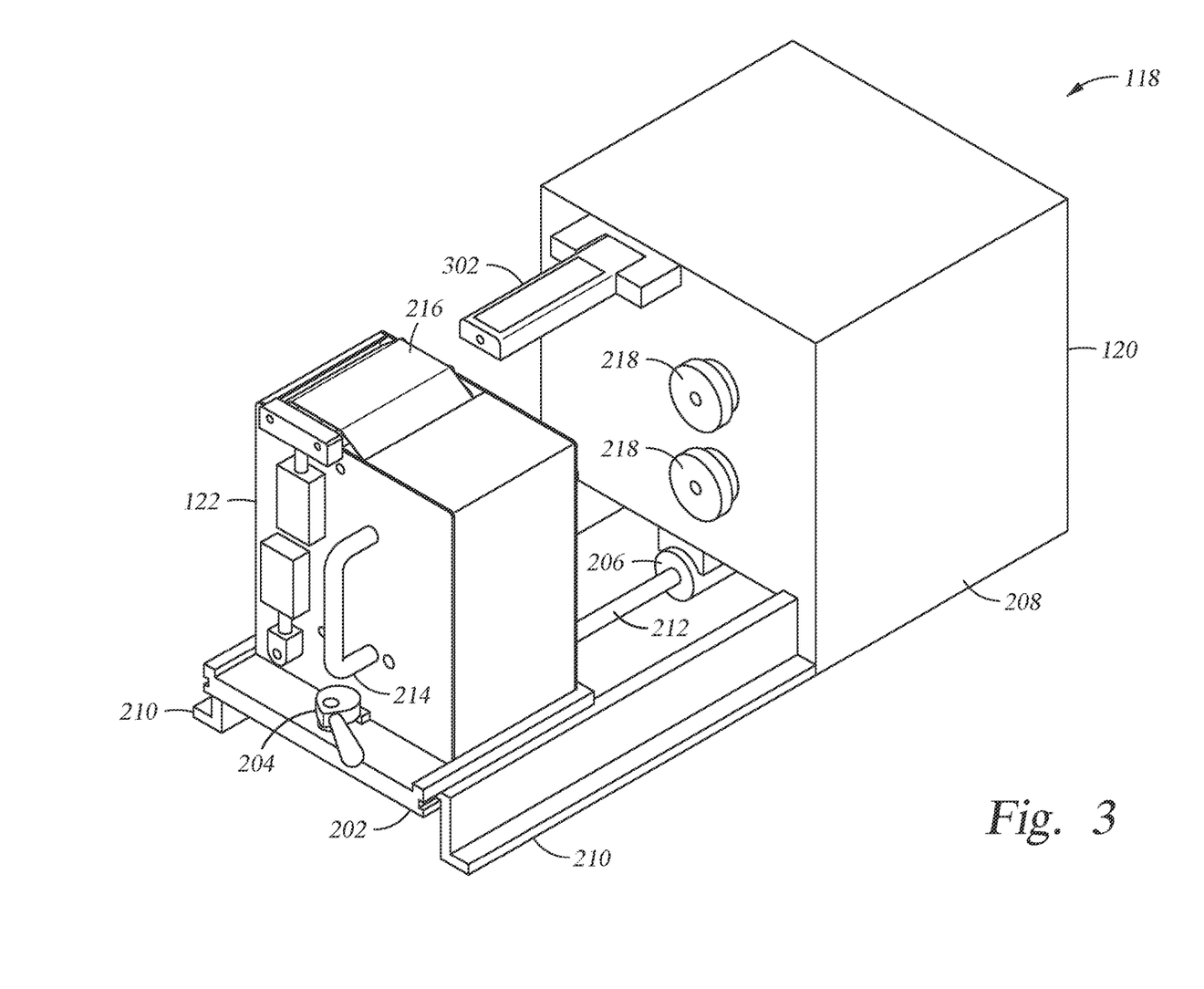
FIG. 3 is a pre-operational view of the test module of FIG. 1B.

FIG. 3 is a pre-operational view of the test module 118. The test cassette 122 is disposed on the tray 202 and the latch 204 is set. The test substrate 216, positioned at the top location of the test cassette 122, aligns with a vacuum extension 302 of the drive 208. The vacuum extension 302 extends from the drive 208 toward the test cassette 122 from a top location of the drive 208. Structures of the test cassette 122 not visible in this view lift the test substrate 216, enabling the vacuum extension 302 to extend below the test substrate 216 when the test cassette 122 is coupled to the drive 208.

Figure 4:
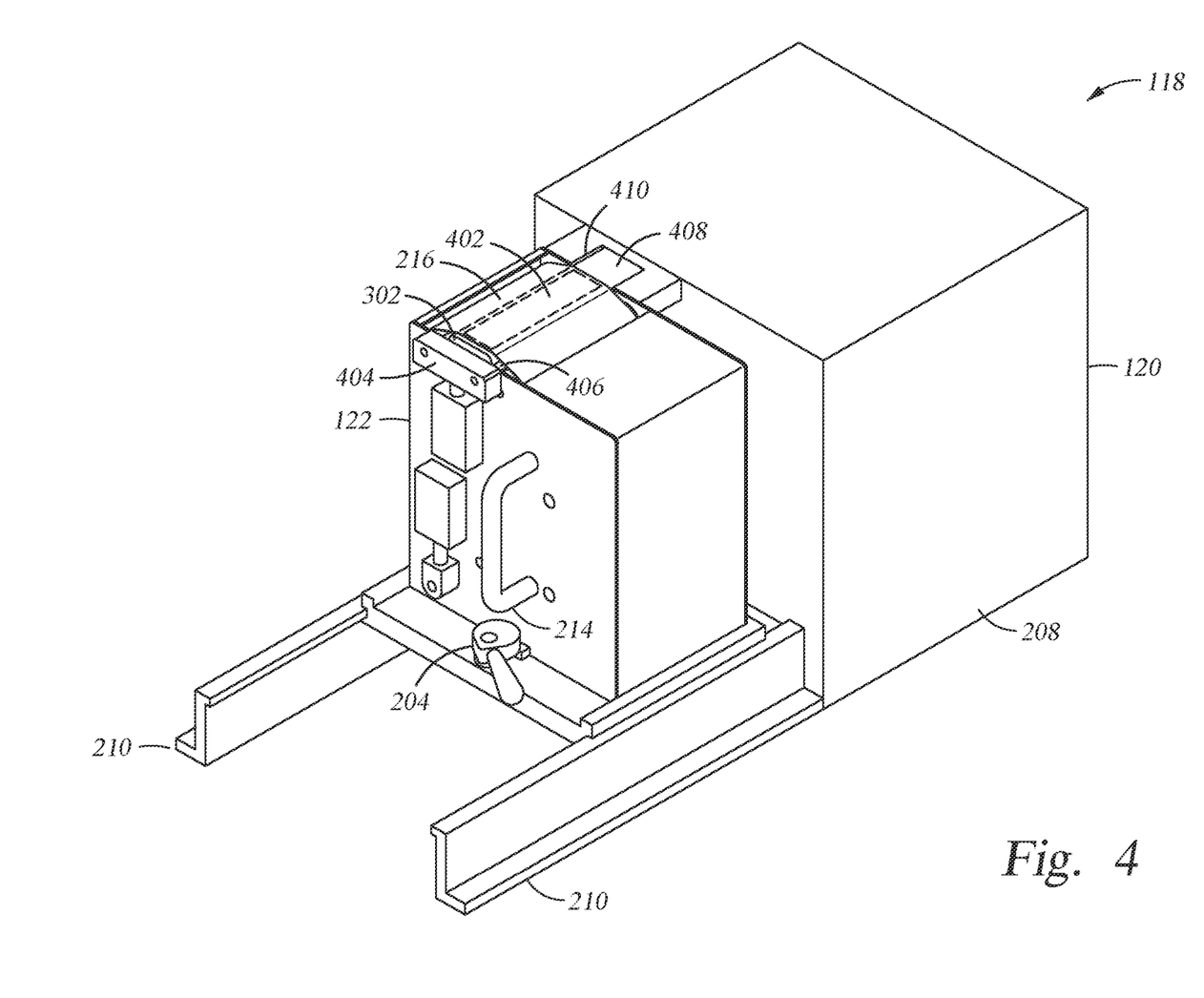
FIG. 4 is an operational view of the test module of FIG. 1B.

FIG. 4 is an operational view of the test module 118. The test cassette 122 is moved into operating position near the drive 208. The vacuum extension 302 extends into the test cassette 122 and below the test substrate 216. The vacuum extension 302 includes a vacuum surface 402 that applies a reduced pressure below the test substrate 216, ensuring the test substrate 216 is very flat during a test print. If print material is ejected toward a test substrate 216 that is not flat, the test pattern can be distorted in unpredictable ways and the test may fail. Prior to a test print, a vacuum source is coupled to the vacuum surface 402 to reduce the pressure between the test substrate 216 and the vacuum surface 402. The test substrate 216 is thus held securely on the vacuum surface 402, with a clearance between the test substrate 216 and the vacuum surface 402 of 5 μm or less. Deviation of the print surface of the test substrate 216 from flatness, when secured to the vacuum surface 402, is less than about 5 μm.

The vacuum surface can be a surface of a porous body having sub-micron holes and passages therethrough to provide vacuum transmission through the porous body. In one case, the porous body is a porous carbon body, for example porous graphite, with 10-15% porosity, sub-micron pore size, and a vacuum surface with flatness of 2 microns. Porosity can be higher or lower. Higher porosity transmits vacuum to the vacuum surface more effectively. In the case of the 10-15% porosity embodiment described above, gas flow through the porous body is 0.2-0.3 L/min, for example 0.25 L/min, at 0.09 MPa pressure difference through the porous body.

Higher porosity allows for more reliable chucking of a test substrate onto the vacuum surface without having to maintain very close proximity of the test substrate to the vacuum surface. Low porosity, and low vacuum transmission, provides less chucking force, which can be made effective by providing higher tensioning of the test substrate to maintain close proximity of the test substrate to the vacuum surface.

In some cases, the entire vacuum extension 302 can be a porous body, while in other cases the porous body can be a member of the vacuum extension 302. For example, the vacuum extension 302 can comprise a holder, and the porous body can be disposed in the holder. Using a holder can facilitate connection of a vacuum source to the vacuum extension 302. The holder can have two members that hold the porous body at either end of the long axis of the porous body. Alternately, the holder can be a rectangular member with a recess in a major surface thereof where the porous body is inserted. The porous body can be embedded in the holder. The porous body can reside in an interior of the holder. For example, the holder can have a vacuum surface with a plurality of holes and an interior cavity that holds the porous body. In embodiments featuring a holder, the holder can be made of any suitable material. Typically the holder is made of a structurally strong material to support reliable connection to a vacuum source and reliable support of a test substrate at the vacuum surface. Example materials include aluminum, ceramic, stainless steel, and the like.

Close proximity of the test substrate to the vacuum surface can also be facilitated by disposing a porous body in a holder such that the vacuum surface of the porous body extends above the holder, for example by 0.1 mm to 2 mm. Increasing width of the porous body can also help by reducing the curvature of the test substrate path above the vacuum surface.

Here, the test substrate 216 has a long dimension and a short dimension. The long dimension is typically long enough for the test substrate 216 to extend into the cassette and engage with a plurality of rollers and mandrels (not shown in this view). The short dimension is a dimension selected to facilitate printing and evaluation of a test pattern on the test substrate 216. The vacuum surface 402 has a long dimension similar to the short dimension of the test substrate 216. The vacuum surface 402 has a short dimension selected to form a highly flat print surface for the test print. The vacuum extension 302, in this configuration, extends across the top of the test cassette 122 under the test substrate 216 to a fork actuator 404. The fork actuator 404 is attached to a first side of the test cassette 122 near the top thereof. A pair of forks 406 extend from the fork actuator 404 toward the drive 208. The test substrate 216 extends across the forks 406. A first fork actuator 404 extends along a first side 408 of the vacuum extension 302, while a second fork actuator 404 extends along a second side 410 of the vacuum extension 302. The forks 406 and the fork actuator 404 constitute a lifter. The fork actuator 404 is operable to extend upward, lifting the forks 406 and the test substrate 216 to facilitate inserting the vacuum extension 302 into the test cassette 122 beneath the test substrate 216. After installation of the test cassette 122, the fork actuator 404 can be operated to lower the forks 406 so that the forks 406 do not contact the test substrate 216 during operation. Operation of the fork actuator 404 may be manual, or may be motorized.

Figure 5:
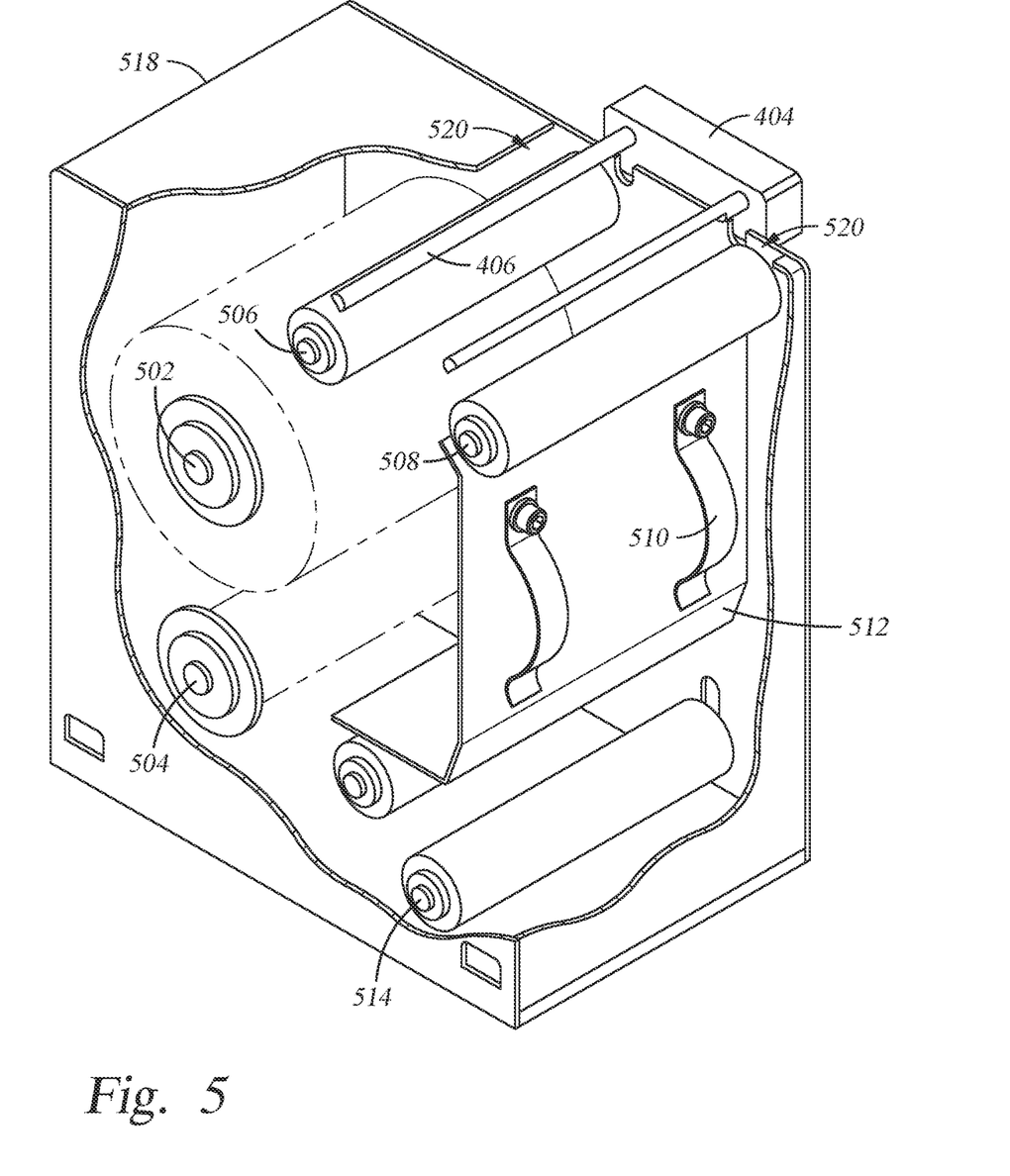
FIG. 5 is a partial cutaway view of a test cassette according to one embodiment.

FIG. 5 is a partial cutaway view of a test cassette 122 according to one embodiment. The fork actuator 404, and the forks 406, are visible at the top of the test cassette 122. Inside the test cassette 122 are two mandrels, a source mandrel 502 and a finish mandrel 504. The source mandrel 502 is rotated to dispense the test substrate 216 toward the forks 406. A first positioning roller 506 is located along a first fork 406 of the fork actuator 404, and a second positioning roller 508 is located along a second fork 406 of the fork actuator 404. The positioning rollers 506 and 508 position the test substrate 216 with respect to the forks 406, as further described below. A pair of tensioners 510 are disposed on a support 512 under the second positioning roller 508. A tension roller 514, applies tensile force to the test substrate 216, which is urged against the tensioners 510 by the positioning of the second positioning roller 508 and the tension roller 514, as described further below. A feed roller 516 accepts the test substrate 216 from the tension roller 514, and the finish mandrel 504 spools the test substrate 216 after use. The test cassette 122 is mostly enclosed by an enclosure 518, but an opening 520 in the top of the enclosure 518 provides access for the test substrate 216 to emerge from the enclosure and engage with the forks 406 and the vacuum extension 302.

Figure 6:
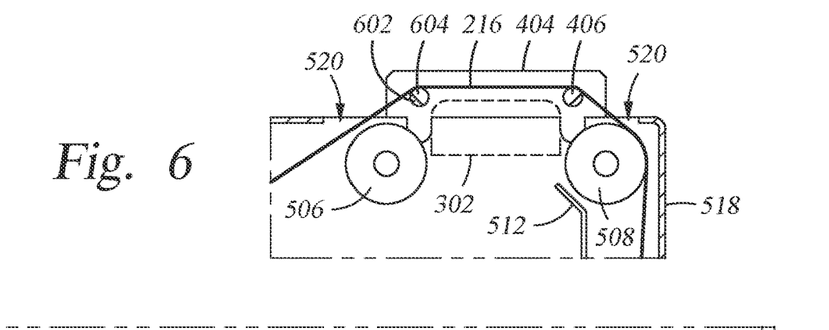
FIG. 6 is a detail view of a portion of the test cassette of FIG. 5.

FIG. 6 is a detail view of the positioning rollers 506 and 508, with the forks 406. The test substrate 216 is shown here extending through the opening 520 in the enclosure 518. Here, the fork actuator 404 is extended to lift the test substrate 216. The test substrate 216 is thus lifted above the vacuum extension 302 so the vacuum extension 302 can extend into the test cassette 122 beneath the test substrate 216. Each fork 406 has a flat side 602 and a round side 604 opposite the flat side 602. The round side 604 contacts the test substrate 216 and provides a smooth lifting surface. The flat side 602 enables lowering the forks 406 toward the positioning rollers 506 and 508 during operation without contacting the positioning rollers 506 and 508.

Figure 7:
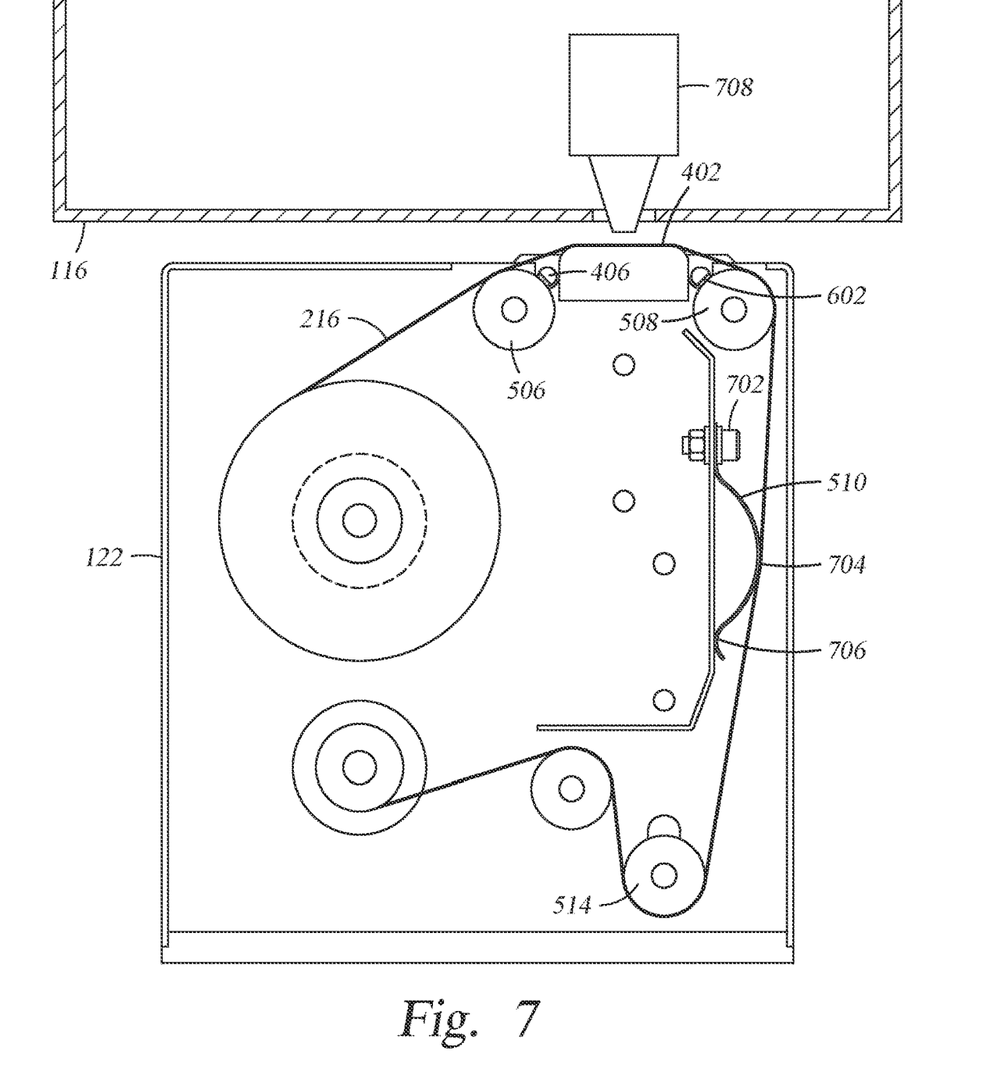
FIG. 7 is a side view of the test cassette of FIG. 5.

FIG. 7 is a side view of the test cassette 122 in proximity to the printhead housing 116 to illustrate performance of a test. The test substrate 216 is shown in operating configuration with the forks 406 lowered. The test substrate 216 extends from the second positioning roller 508 to the tension roller 514, contacting the tensioners 510. Here, the tensioners 510 are flex springs, metal strips that are attached to the support 512 by a fastener 702 and extend away from the support 512 and curve back toward the support 512 forming an arch 704. The metal strip curves back toward the support 512 and contacts the support 512 at a landing 706 that can slide along the support 512 as the tensioner 510 flexes. As force is applied to the test substrate 216 by the tensioning roller 514, compressive force is applied to the tensioners 510, which react by absorbing at least a portion of the compressive force as flex. The tensioners 510 thus maintain tension on the test substrate 216 when the vacuum is released at the vacuum surface 402. The tension in the test substrate 216 maintains close proximity between the test substrate 216 and the vacuum surface 402 such that when vacuum is applied at the vacuum surface 402, the test substrate 216 is chucked to the vacuum surface 402. Here, the forks 406 can be seen in retracted operating position, where the flat side 602 of the forks allows for clearance between the forks 406 and the positioning rollers 506 and 508.

The printhead housing 116 includes an imaging device 708, such as a camera. The imaging device 708 is positionable over the test substrate 216, over the vacuum surface 402, to capture an image of the test pattern printed on the test substrate 216. The print heads are also located in the printhead housing 116, and are omitted from this view for simplicity. The imaging device 708 is shown here with an imaging aperture that is smaller than the operating surface of the test substrate 216. In operation, the test module 118 and the imaging device 708 are relatively moved and positioned to allow capturing a plurality of images so that the entire test pattern can be imaged.

As can be seen in FIG. 7, the imaging device 708 collects light reflected from the test substrate 216 and from the vacuum surface 402. Dots printed on the test substrate 216 produce a light pattern that can be analyzed to determine characteristics of the dots. The background reflected light can be selected to maximize resolution of the dots by the imaging device 708. For example, by choosing a color of the vacuum surface that maximizes dot resolution, the test module can have the best performance. A carbon vacuum surface, as described above, will have a relatively black color, which may be best for imaging light-colored materials printed on the test substrate. For imaging dark-colored materials, a relatively white color vacuum surface may be useful. Such color may be available by using a ceramic vacuum surface, which may be porous. In other cases, reflective surfaces, such as bare aluminum, may be useful to provide maximum dot resolution.

Figure 8:
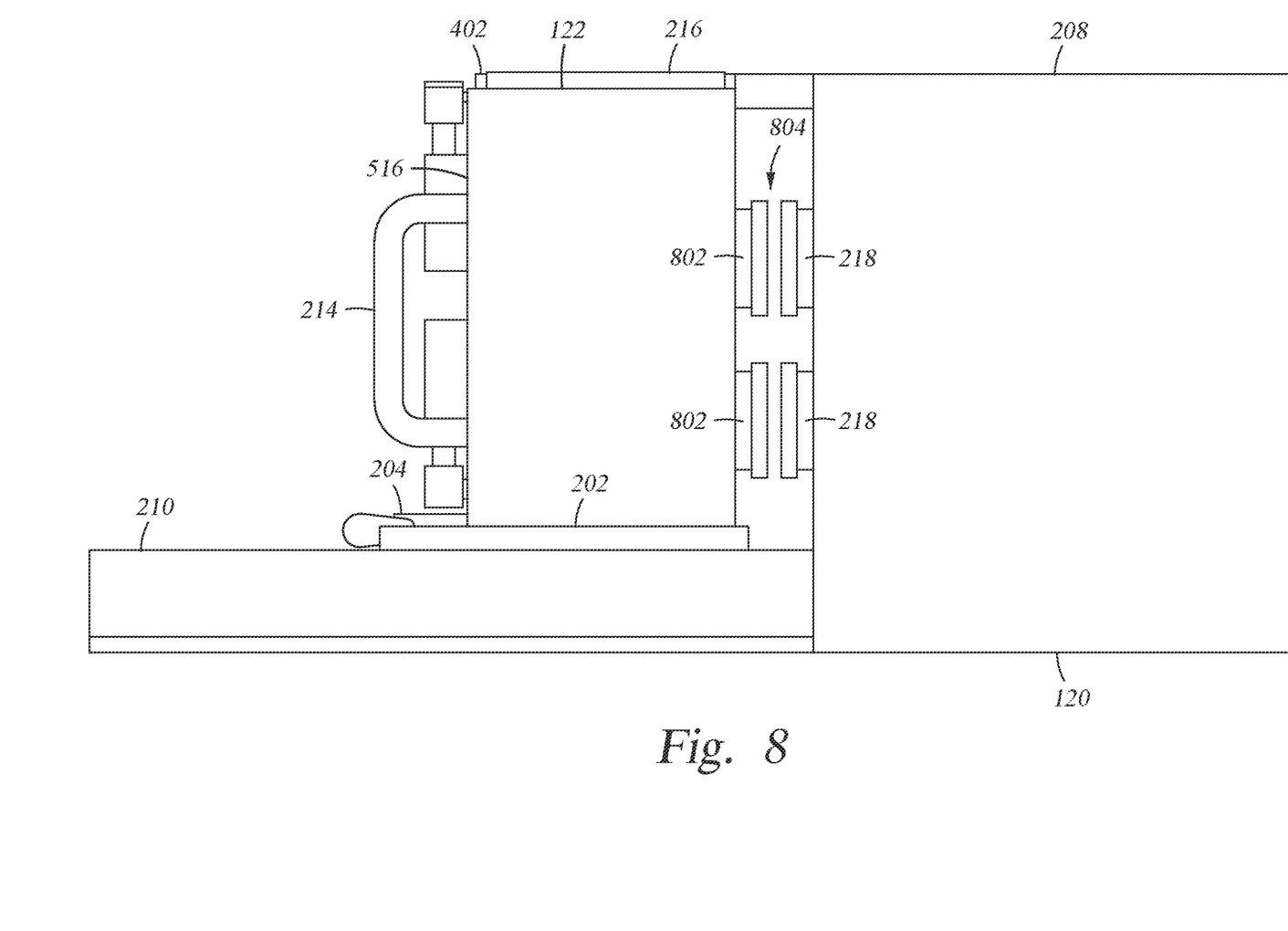
FIG. 8 is a side view of the test module of FIG. 1B.

FIG. 8 is a side view of the test module 118 in operating configuration. The test cassette 122 is shown coupled to the mount 120 in operating proximity with the drive 208. The test cassette 122 has two cassette rotators 802 that extend from the test cassette 122 toward the drive 208 and magnetically couple to the rotators 218 of the drive 208. A clearance 804 is maintained between the drive rotators 218 and the cassette rotators 802. The cassette rotators 802 are coupled through the enclosure 518 to the source and finish mandrels 502 and 504. In operation, the drive rotators 218 are rotated, and the magnetic coupling to the cassette rotators 802 causes the cassette rotators 802 to rotate, thus rotating the source and finish mandrels 502 and 504. When a test pattern is printed on the test substrate 216, the test pattern is imaged, vacuum is discontinued at the vacuum surface 402, and then the mandrels 502 and 504 are rotated to advance the test substrate 216 one "frame" or test location. A new clear portion of the test substrate 216 is positioned over the vacuum surface 402, and vacuum applied to secure the test substrate 216 for another test. When the last test location of the test substrate 216 is used, the test cassette 122 can be removed and another new test cassette 216 installed.

When installing and removing the test cassette 216 the tray actuator 206 is operated to extend the tray 202 to the loading position. The tray actuator 206 has enough power to overcome the magnetic coupling of the rotators 802 and 218 such that the test cassette 122 can be removed from the tray 206.

The test substrate 216 is a flexible material that can wind around the mandrels and rollers. Typically, a plastic film-like material is used. The flexible material may be transparent or translucent to provide suitable contrast with the optical characteristics of the print material deposited on the test substrate 216 for optimal imaging.

Figure 9A:
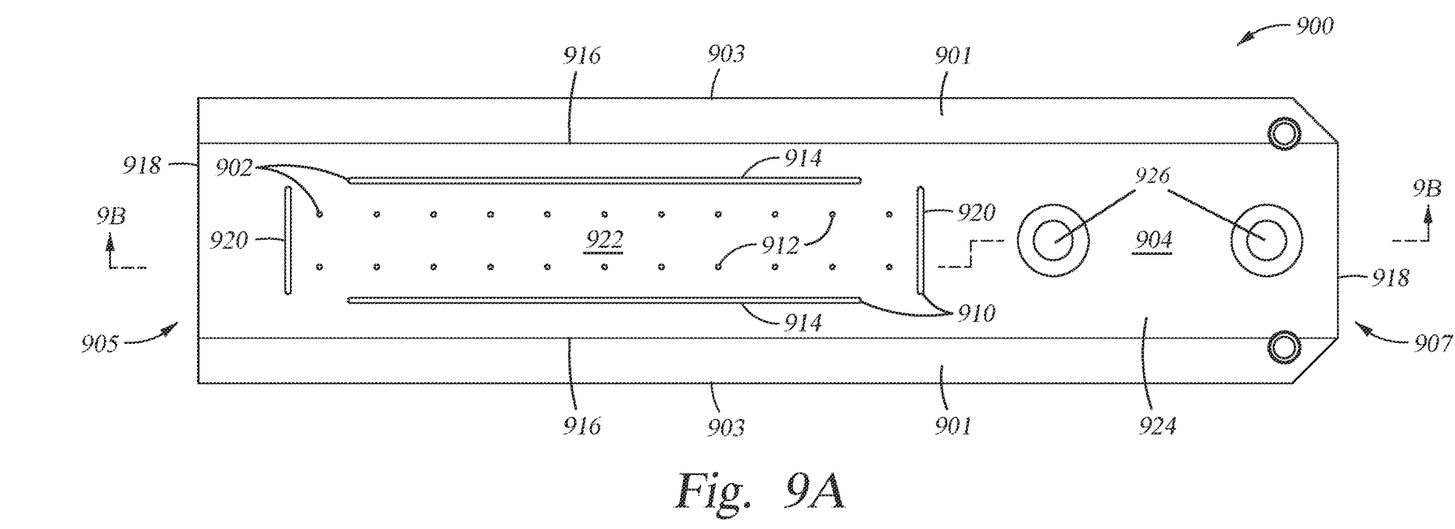
FIG. 9A is a top view of a substrate holder according to one embodiment.
Figure 9B:
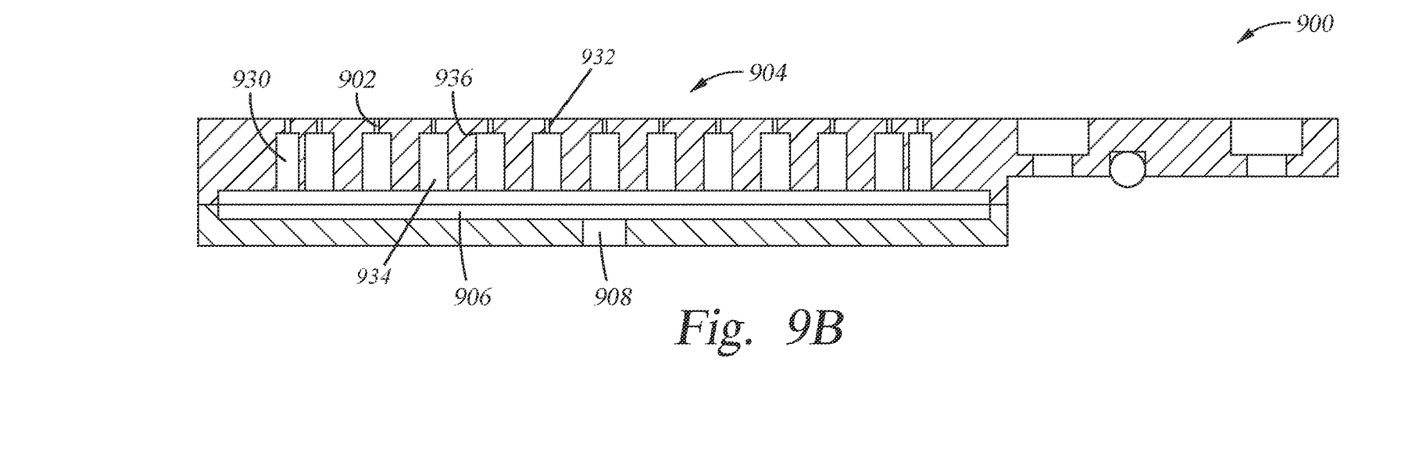
FIG. 9B is a cross-sectional view of the substrate holder of FIG. 9A.

FIG. 9A is a top view of a substrate holder 900 according to one embodiment. The substrate holder 900 is useable with test substrates in embodiments described herein. FIG. 9B is a cross-sectional view of the substrate holder 900 of FIG. 9A. The substrate holder 900 can provide the vacuum surface 302 of FIG. 3. The substrate holder 900 is a vacuum holder that flows gas through openings 902 in a surface 904 of the substrate holder 900. The substrate holder 900 has an internal plenum 906 that supports fluid flow through the substrate holder 900 from the surface 904 to the internal plenum 906 and out through a port 908. A vacuum source (not shown) can be fluidly coupled to the port 908 to evacuate gas between the surface 904 and a substrate disposed on or over the surface 904 to provide secure support for the substrate. The surface 904 here extends from a first end 905 of the substrate holder 900 to a second end 907 of the substrate holder 900, opposite from the first end 905. The surface 904 extends partway across the substrate holder 900. A bevel 901 connects the surface 904 to the sides 903 of the substrate holder 900, which connect the first end 905 to the second end 907.

The surface 904 has a plurality of openings 902 that provide fluid flow from the surface 904 to the internal plenum 906. The openings 902 include a plurality of slots 910 and holes 912. The slots 910 are arranged around a periphery of the surface 904, while the holes 912 are arranged in a central area of the surface 904. The holes 912 are arranged in two rows, each row extending along a direction of a major axis of the substrate holder 900, the two rows on either side of the major axis equidistant therefrom. The surface 904 has a generally rectangular shape, with two long sides 916 and two short sides 918. The slots 910 include a plurality of long slots 914 extending parallel to the long sides 916 of the surface 904 and a plurality of short slots 920 extending parallel to the short sides 918 of the surface 904. The slots 910 generally bound a vacuum area 922 of the surface 904 where vacuum can securely hold a substrate. The vacuum area 922 extends partway along the surface 904 from the first end 905 to the second end 907 of the substrate holder 900, and is located closer to the first end 905 than to the second end. The long slots 914 are positioned adjacent to the long sides 916 of the surface 904. A first short slot 920 is positioned near a short side 918. A second short slot 920 is positioned opposite the first short slot 920, the short slots 920 and long slots 914 defining a boundary of the vacuum area 922. The surface 904 extends beyond the second short slot 920 to an attachment region 924 of the surface 904. The attachment region 924, located between the second short slot 920 and the second end 907, has two holes 926 for attaching the substrate holder 900 to a processing apparatus such as the test module 118. The openings 902 are arranged symmetrically across the surface 904 to provide uniform fluid flow at the vacuum region 922 for a uniform attractive force between the substrate and the surface 904.

The substrate holder 900 has a passage 930 for each opening 902 to provide fluid coupling of the opening 902 to the plenum 906. Each passage 930 has a first section 932 having a first diameter and a second section 934 having a second diameter greater than the first diameter. The first section 932 of each passage 930 extends from the opening 902 toward the plenum 906, while the second section 934 of each passage 930 extends from the plenum 906 toward the opening 902. The first and second sections, 932 and 934, of each passage meet at a transition 936. Here, the first section 932 of all the passages 930 are the same length and the second section 934 of the passages 930 are the same length, but the lengths can be varied if desired to influence fluid flow patterns at the surface 904. The transition 936

Prior to attaching the substrate to the surface 904, the substrate curves above the surface 904. The larger the gap between the substrate and the surface 904, the more fluid flow is needed to attach the substrate to the surface 904 by vacuum. The slots 910 function as high flow openings to draw the substrate toward the surface 904 according to the Bernoilli principle. The slots 910 draw the substrate to within an attachment zone where flow from the holes 912 can provide the final increment of attachment force to attach the substrate to the surface 904. The symmetrical pattern of openings provides a symmetrical flow pattern to reliably position the substrate with respect to the surface 904 before attachment. In this case, the slots 910 have a width that is larger than the diameter of the holes 912, which are all the same size here. Also, the total areal extent of the slots 910 is greater than the total areal extent of the holes 912, providing a larger flow cross-section through the slots 910 than through the holes 912. This has the effect of creating a uniform chucking force that is somewhat greater at peripheral areas of the vacuum region 922 to attract the substrate toward the surface 904.

While the foregoing is directed to embodiments of the present invention, other and further embodiments of the present disclosure may be devised without departing from the basic scope thereof, and the scope thereof is determined by the claims that follow.

What is claimed is:

1. An inkjet printer, comprising:
a substrate support;
a calibration module disposed adjacent to the substrate support and comprising a stage member with a vacuum extension that provides a chucking force for a test substrate that is greater at peripheral areas than central areas the vacuum extension comprising a vacuum surface, an internal plenum, and openings in the vacuum surface that provide fluid flow from the surface to the internal plenum; and
a print assembly disposed across the substrate support, the print assembly comprising a printhead and a calibration imaging device positionable to face the stage member.

2. The inkjet printer of claim 1, wherein the vacuum extension comprises a porous body.

3. The inkjet printer of claim 1, wherein the calibration module further comprises a tensioner that comprises a metal strip.

4. The inkjet printer of claim 1, wherein the calibration module further comprises a linear positioner.

5. The inkjet printer of claim 1, wherein the vacuum extension comprises holes and slots.

6. The inkjet printer of claim 1, wherein the vacuum extension has a vacuum surface that is flat.

7. The inkjet printer of claim 1, wherein the vacuum extension engages with a test substrate to provide a deviation from flatness of the substrate surface that is less than about 5 μm.

8. The inkjet printer of claim 1, wherein the vacuum extension comprises a holder and a porous body embedded in the holder.

9. An inkjet printer, comprising:
- a substrate support;
- a calibration module disposed adjacent to the substrate support and comprising a stage member with a vacuum extension that provides a chucking force for a test substrate that is greater at peripheral areas than central areas the vacuum extension comprising a vacuum surface in fluid communication with an internal plenum; and
- a print assembly disposed across the substrate support, the print assembly comprising a printhead and a calibration imaging device movable independently from the printhead and positionable to face the stage member.

10. The inkjet printer of claim 9, wherein the vacuum surface has a plurality of openings arranged symmetrically across the surface.

11. The inkjet printer of claim 9, wherein the calibration module further comprises a tensioner that comprises a metal strip.

12. The inkjet printer of claim 9, wherein the calibration module further comprises a linear positioner.

13. The inkjet printer of claim 9, wherein the vacuum surface comprises a ceramic porous body.

14. The inkjet printer of claim 13, wherein the vacuum extension further comprises a holder for the ceramic porous body.

15. The inkjet printer of claim 9, wherein the vacuum surface has slots.

16. The inkjet printer of claim 15, wherein the slots comprise short slots and long slots.

17. The inkjet printer of claim 9, wherein the vacuum surface has holes arranged in rows.

18. An inkjet printer, comprising:
- a substrate support;
- a calibration module disposed adjacent to the substrate support and comprising a stage member with a vacuum extension having a flat vacuum surface that provides a chucking force for a test substrate that is greater at peripheral areas than central areas, wherein the flat vacuum surface engages with a test substrate to provide a deviation from flatness of the substrate surface that is less than about 5 µm; and
- a print assembly disposed across the substrate support, the print assembly comprising a printhead and a calibration imaging device movable independently from the printhead and positionable to face the stage member.

* * * * *